(12) United States Patent
Zilberberg et al.

(10) Patent No.: US 9,210,147 B1
(45) Date of Patent: Dec. 8, 2015

(54) METHOD, APPARATUS AND COMPUTER PROGRAM PRODUCT FOR ASSESSING RISK ASSOCIATED WITH AUTHENTICATION REQUESTS

(71) Applicant: EMC Corporation, Hopkinton, MA (US)

(72) Inventors: Ido Zilberberg, Netanya (IL); Lior Asher, Tel Aviv (IL); Marcelo Blatt, Modiin (IL); Alex Zaslavsky, Petah Tikva (IL)

(73) Assignee: EMC Corporation, Hopkinton, MA (US)

( * ) Notice: Subject to any disclaimer, the term of this patent is extended or adjusted under 35 U.S.C. 154(b) by 165 days.

(21) Appl. No.: 13/928,880

(22) Filed: Jun. 27, 2013

(51) Int. Cl.
*H04L 29/06* (2006.01)

(52) U.S. Cl.
CPC ....................................... *H04L 63/08* (2013.01)

(58) Field of Classification Search
None
See application file for complete search history.

(56) References Cited

U.S. PATENT DOCUMENTS

| 7,165,051 | B2 * | 1/2007 | Ronning et al. | 705/64 |
|---|---|---|---|---|
| 7,908,644 | B2 * | 3/2011 | Roskind et al. | 726/3 |
| 8,079,079 | B2 * | 12/2011 | Zhang et al. | 726/19 |
| 8,079,085 | B1 * | 12/2011 | Wu et al. | 726/24 |
| 8,666,841 | B1 * | 3/2014 | Claridge et al. | 705/26.35 |
| 2009/0099988 | A1 * | 4/2009 | Stokes et al. | 706/20 |
| 2009/0182653 | A1 * | 7/2009 | Zimiles | 705/30 |
| 2010/0094791 | A1 * | 4/2010 | Miltonberger | 706/46 |
| 2011/0125658 | A1 * | 5/2011 | Lanxner et al. | 705/318 |
| 2011/0131122 | A1 * | 6/2011 | Griffin et al. | 705/35 |
| 2012/0226613 | A1 * | 9/2012 | Adjaoute | 705/44 |

* cited by examiner

*Primary Examiner* — Lisa Lewis
*Assistant Examiner* — Henry Tsang
(74) *Attorney, Agent, or Firm* — Krishnendu Gupta; Jason A. Reyes

(57) ABSTRACT

There is disclosed a technique for use in providing an assessment of authentication requests. In one embodiment, the technique comprises receiving an authentication request with post-authentication feedback and an authentication request with no post-authentication feedback. In the same embodiment, the post-authentication feedback can include a marking indicating that the request is one of a genuine or fraudulent status after review by an analyst. If a request does not possess a post-authentication feedback then it is considered genuine status. The technique can then assign the status of the requests to a distinctive attribute associated with the requests before performing a computation which produces a computational result that is indicative of the risk associated with the distinctive attribute.

19 Claims, 3 Drawing Sheets

METHOD, APPARATUS AND COMPUTER PROGRAM PRODUCT FOR ASSESSING RISK ASSOCIATED WITH AUTHENTICATION REQUESTS

TECHNICAL FIELD

The present invention relates generally to user authentication, and more particularly to providing an assessment of authentication requests.

BACKGROUND OF THE INVENTION

Adaptive authentication systems typically perform authentication operations which involve the comparison of a recently received authentication request to conventional historical authentication requests issued by a known user such that a request with irregular behavior can be identified. For example, suppose that a bank customer normally logs into his account from London between 4 and 6 PM. Suppose further that the bank receives a series of login attempts to that account between the hours of 2 and 4 AM from a location in Texas. In such an example, authentication will more than likely be considered unsuccessful and some follow-on or remedial activity will usually takes place, e.g., a retry of authentication, step-up authentication, outputting an alert, and so on.

As will be known in the art, these type of adaptive authentication systems can employ a machine learning process which facilitates the building and updating of a model used to assess the risk of the authentication requests received at the authentication system. Typically, the updating of these models is performed by employing explicit feedback from analysts. Such explicit feedback can consist of an assessment of particular requests as either being fraudulent or non-fraudulent based on the results of a manual investigation. The machine learning module can take in the results of the manual investigation and update the model to account for differences between predictions of the model and results of the manual investigation.

However, the above suffers in that the process of tuning the model based on explicit feedback is limited. Along these lines, the cost of carrying out the investigations that generate the results used as input into a machine learning process may be expensive. With a finite budget for investigations, the amount of input for the machine learning process is limited.

There is therefore a need for another approach which can assist in assessing authentication requests.

SUMMARY OF THE INVENTION

There is disclosed a method for use in providing an assessment of authentication requests, the method comprising: receiving a plurality of authentication requests, wherein the plurality of authentication requests comprises at least one authentication request with post-authentication feedback and at least one authentication request with no post-authentication feedback; based on the post-authentication feedback, determining a status that is applicable to the at least one authentication request with the post-authentication feedback, wherein the status comprises one of a genuine and a fraudulent status; based on the no post-authentication feedback, determining that a genuine status is applicable to the at least one authentication request with the no post-authentication feedback; determining at least one distinctive attribute associated with the plurality of authentication requests; based on the status of the plurality of authentication requests, assigning the status of the plurality of authentication requests to the at least one distinctive attribute associated therewith; performing a computation for the at least one distinctive attribute based on the status assigned thereto, wherein the computation produces a computational result that is indicative of the risk associated with the at least one distinctive attribute; and providing the computational result for use in processing authentication requests.

There is also disclosed an electronic apparatus, comprising: a network interface; memory; and control circuitry coupled to the network interface and memory, the memory storing instructions, which, when carried out by the control circuitry, cause the control circuitry to: receive a plurality of authentication requests, wherein the plurality of authentication requests comprises at least one authentication request with post-authentication feedback and at least one authentication request with no post-authentication feedback; based on the post-authentication feedback, determine a status that is applicable to the at least one authentication request with the post-authentication feedback, wherein the status comprises one of a genuine and a fraudulent status; based on the no post-authentication feedback, determine that a genuine status is applicable to the at least one authentication request with the no post-authentication feedback; determine at least one distinctive attribute associated with the plurality of authentication requests; based on the status of the plurality of authentication requests, assign the status of the plurality of authentication requests to the at least one distinctive attribute associated therewith; perform a computation for the at least one distinctive attribute based on the status assigned thereto, wherein the computation produces a computational result that is indicative of the risk associated with the at least one distinctive attribute; and provide the computational result for use in processing authentication requests.

There is further disclosed a computer program product having a non-transitory computer readable storage medium which stores a set of instructions for use in providing an assessment of authentication requests, the set of instructions, when carried out by computerized circuitry, causing the computerized circuitry to perform a method of: receiving a plurality of authentication requests, wherein the plurality of authentication requests comprises at least one authentication request with post-authentication feedback and at least one authentication request with no post-authentication feedback; based on the post-authentication feedback, determining a status that is applicable to the at least one authentication request with the post-authentication feedback, wherein the status comprises one of a genuine and a fraudulent status; based on the no post-authentication feedback, determining that a genuine status is applicable to the at least one authentication request with the no post-authentication feedback; determining at least one distinctive attribute associated with the plurality of authentication requests; based on the status of the plurality of authentication requests, assigning the status of the plurality of authentication requests to the at least one distinctive attribute associated therewith; performing a computation for the at least one distinctive attribute based on the status assigned thereto, wherein the computation produces a computational result that is indicative of the risk associated with the at least one distinctive attribute; and providing the computational result for use in processing authentication requests.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
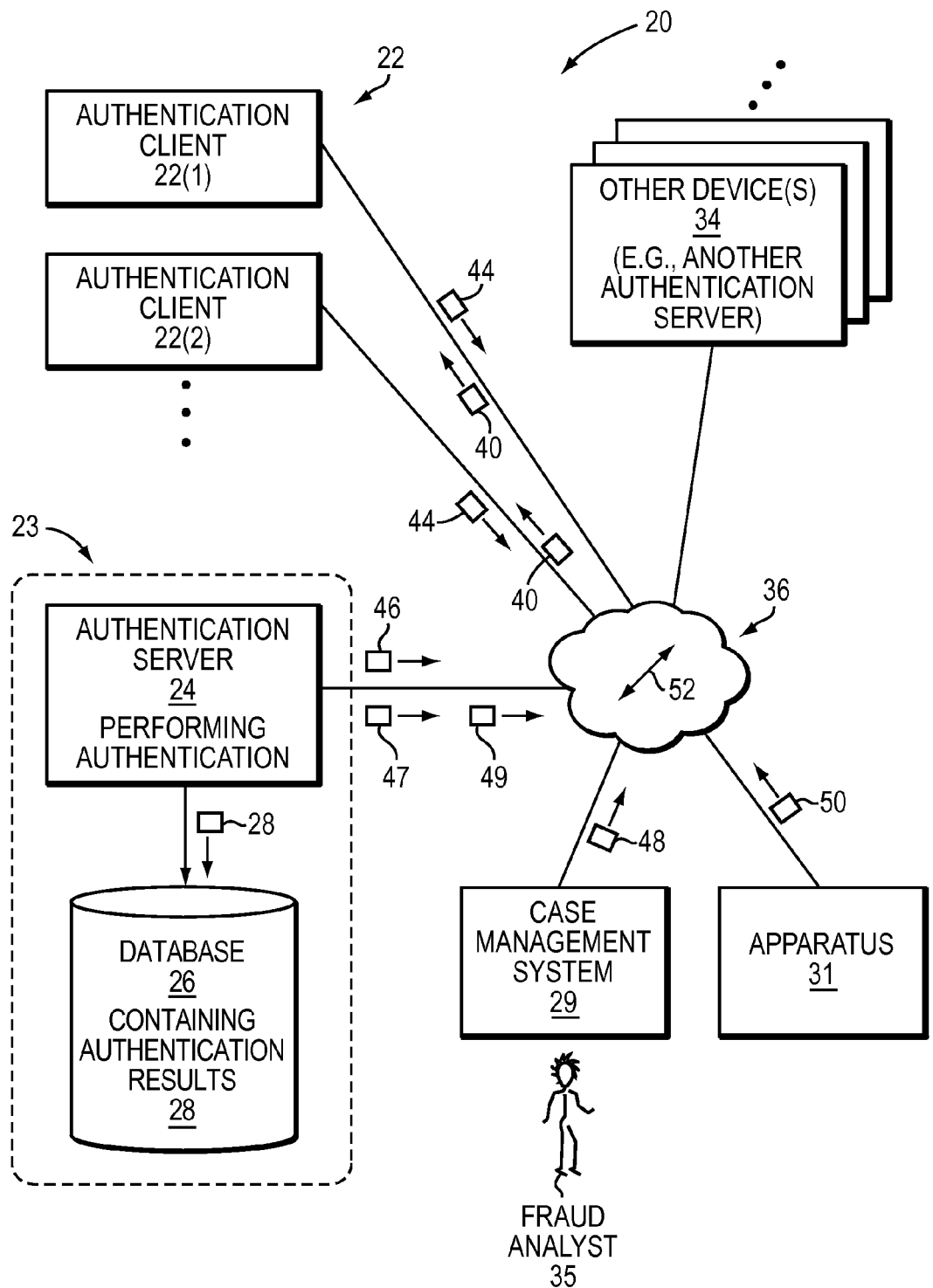
FIG. 1 is a block diagram illustrating an electronic environment which enjoys enhanced security by providing an assessment of authentication requests.

Referring to FIG. 1, there is illustrated an electronic environment 20 suitable for use in providing an assessment of authentication requests. The electronic environment 20 includes authentication clients 22(1), 22(2), . . . (collectively, authentication clients 22), an authentication system 23 comprising an authentication server 24 and a database 26, a case management system 29, a specialized apparatus 31, one or more other device(s) 34, and communications medium 36.

The authentication clients 22 are constructed and arranged to control access to protected resources. As will be explained in further detail shortly, each authentication client 22 receives resource access requests 40 from users (e.g., account login attempts, transaction verification/confirmation attempts, etc.), and then communicates with the authentication server 24 to authenticate the users using authentication information (e.g., a user ID, a password and/or PIN, a one-time passcode, etc.). Examples of suitable authentication clients 22 include online stores, online banks/brokerages, file servers, VPN servers, building security systems, and so on.

The authentication server 24 is constructed and arranged to receive authentication requests 44 from the authentication clients 22, and perform authentication operations in response to the authentication requests 44 in order to authenticate the users. The authentication server 24 provides authentication responses 46 indicating whether authentication was successful back to the authentication clients 22. The authentication server 24 also stores authentication results 28 in the database 26.

Additionally, the authentication server 24 is also constructed and arranged to send selected requests to case management system 29. Authentication server 24 is further constructed and arranged to monitor the case management system 29 for feedback parameters from fraud analysts 35 working at the case management system 29. Authentication server 24 is also constructed and arranged to communicate with apparatus 31.

The case management system 29 is constructed and arranged to provide a fraud analyst 35 with access to resources to investigate whether authentication requests are fraudulent or non-fraudulent. Case management system 29 is further constructed and arranged to send message 48 to authentication server 24 containing values of feedback parameters.

The specialized apparatus 31 is constructed and arranged to provide an assessment 50 of authentication requests. As will be explained in further detail below, the assessment 50 is based on distinctive attributes or characteristics associated with authentication requests. The specialized apparatus 31 then provides the assessment 50 for use in processing authentication requests (e.g., sending the assessment 50 to the authentication server 24 in a feedback manner, storing the assessment 50 in the database 26, distributing the assessment 50 to other authentication servers such as the other devices 34, and so on). In some arrangements, the specialized apparatus 31 assigns a score to the assessment 50 (e.g., for use in adaptive authentication).

The other devices 34 represent other components of the electronic environment 20 such as members/subscribers of an anti-fraud network which receives the assessment 50 from the specialized apparatus 31 and utilizes the assessment 50 to protect access to resources. In some arrangements, multiple authentication servers share their authentication results for use in generating the assessment 50.

The communications medium 36 is constructed and arranged to connect the various components of the electronic environment 20 together to enable these components to exchange electronic signals 52 (e.g., see the double arrow 52). At least a portion of the communications medium 36 is illustrated as a cloud to indicate that the communications medium 36 is capable of having a variety of different topologies including backbone, hub-and-spoke, loop, irregular, combinations thereof, and so on. Along these lines, the communications medium 36 may include copper-based data communications devices and cabling, fiber optic devices and cabling, wireless devices, combinations thereof, etc. Furthermore, the communications medium 36 is capable of supporting LAN-based communications, SAN-based communications, cellular communications, combinations thereof, etc.

It should be understood that the database 26 as illustrated in FIG. 1 is separate from the authentication server 24 by way of example only. In some arrangements, the database 26 is more tightly integrated with the authentication server 24 (e.g., co-located with or forms part of the authentication server 24).

During operation, the authentication client 22 receives authentication requests 40 and sends requests 44 to authentication server 24 over communications medium 36. Authentication server 24 inputs parameter values for each request 44 and produces authentication responses 46 for each of the requests 44 indicative of a level of risk involved in processing the requests.

It should be understood that, in some arrangements, the authentication server 24 includes an adaptive authentication risk score engine that assigns a risk score for each request. The risk score indicates a level of risk in that a high risk score indicates high risk in processing a request, and a low risk score indicates a low level of risk in processing the request.

The authentication server 24 stores the parameter values of each request in database 26 along with the results 28. Periodically, the authentication server 24 selects particular request parameter values for further investigation by case management system 29. In some arrangements, authentication server 24 selects the particular request parameter values based on the assigned risk score: the requests having the highest risk scores are chosen for further investigation.

The case management system 29 receives request 47 to perform a manual investigation on a particular request. Case management system 29 then assigns the task of such an investigation to fraud analyst 35. Fraud analyst 35 executes particular actions in carrying out the manual investigation and comes to a conclusion as to whether request is fraudulent or non-fraudulent.

Once the investigation is complete, case management system 29 sends message 48 containing the investigation results. Authentication server 24 receives message 48 and inputs the investigation results and the values of the feedback parameters. The server 24 takes in these values and the investigation result and adjusts the Bayesian coefficients of a model based on this input.

In this particular case, the authentication server 24 also sends a message 49 or communication to the apparatus 31 periodically comprising a plurality of authentication requests. For example, these authentication requests can contain the transactions for which a case was opened at the case management system 29 together with other transactions received for which no case was open at the case management system 29. It should be appreciated that at least some of the transactions for which cases were open may have been authenticated initially but on further investigation the analyst 35 may have indicated that the request was a fraudulent request.

As discussed above, the other devices 34 may represent members/subscribers of an anti-fraud network, and these devices 34 may be authentication servers which share their authentication results in much the same manner. The apparatus 31 will then initiate a process of assessing authentication requests as will be described in further details below.

Figure 2:
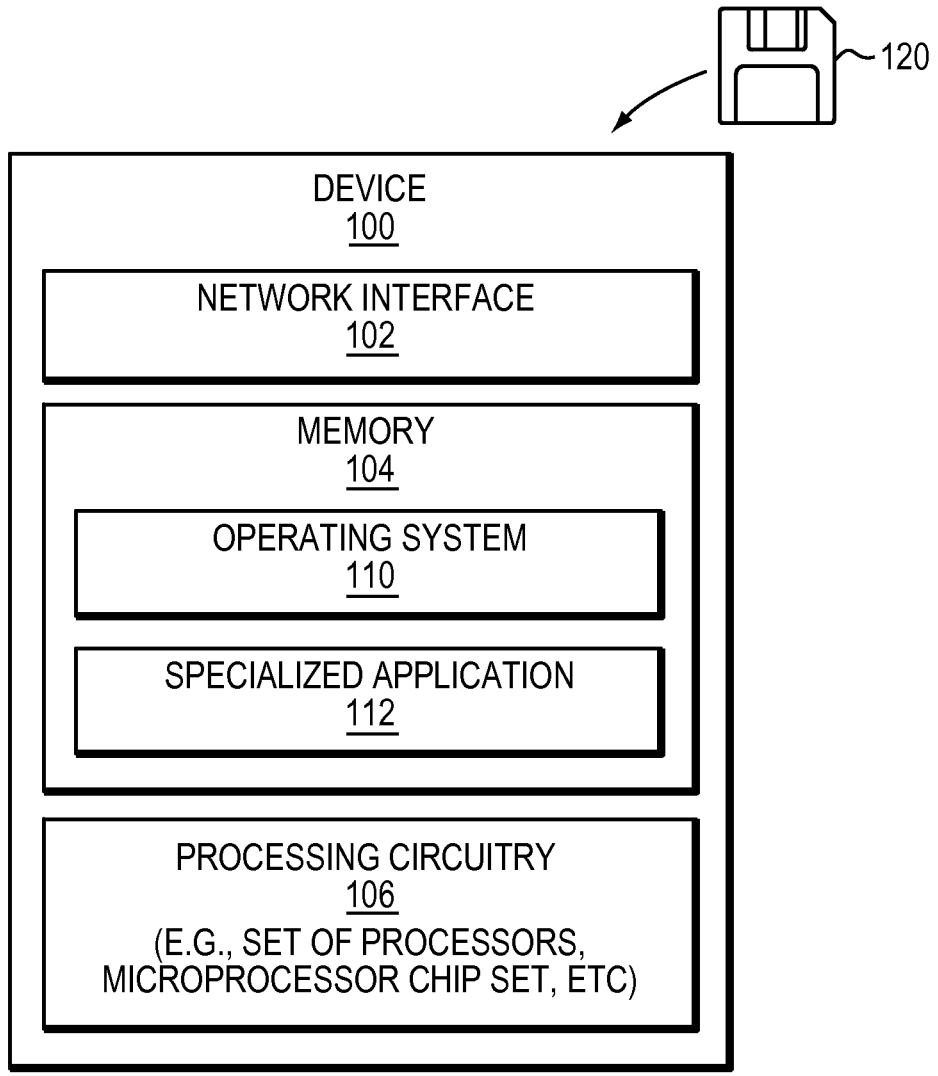
FIG. 2 is a block diagram illustrating particular details of a device included in the environment of FIG. 1.

Referring to FIG. 2, there is illustrated a device 100 which is suitable for use as the specialized apparatus 31. The device 100 includes a network interface 102, memory 104, and processing circuitry 106. The network interface 102 is constructed and arranged to connect the device 100 to the communications medium 36. Accordingly, the network interface 102 enables the device 100 to communicate with the other components of the electronic environment 20 (FIG. 1).

The memory 104 is intended to represent both volatile storage (e.g., DRAM, SRAM, etc.) and non-volatile storage (e.g., flash memory, magnetic disk drives, etc.). The memory 104 stores a variety of software constructs including an operating system 110 and a specialized application 112.

The processing circuitry 106 is constructed and arranged to operate in accordance with the various software constructs stored in the memory 104. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 120 is capable of delivering all or portions of the software to the device 100. The computer program product 120 has a non-transitory (or non-volatile) computer readable medium which stores a set of instructions which controls one or more operations of the device 100. Examples of suitable computer readable storage media include tangible articles of manufacture and apparatus which store instructions in a non-volatile manner such as CD-ROM, flash memory, disk memory, tape memory, and the like.

During operation, the processing circuitry 106 executes the operating system 110 in order to manage particular computerized resources of the device 100 such as memory allocation and processor cycles. Additionally, the processing circuitry 106 executes the specialized application 112 to perform a process 300 for use in assessing authentication requests as will be described further below.

Figure 3:
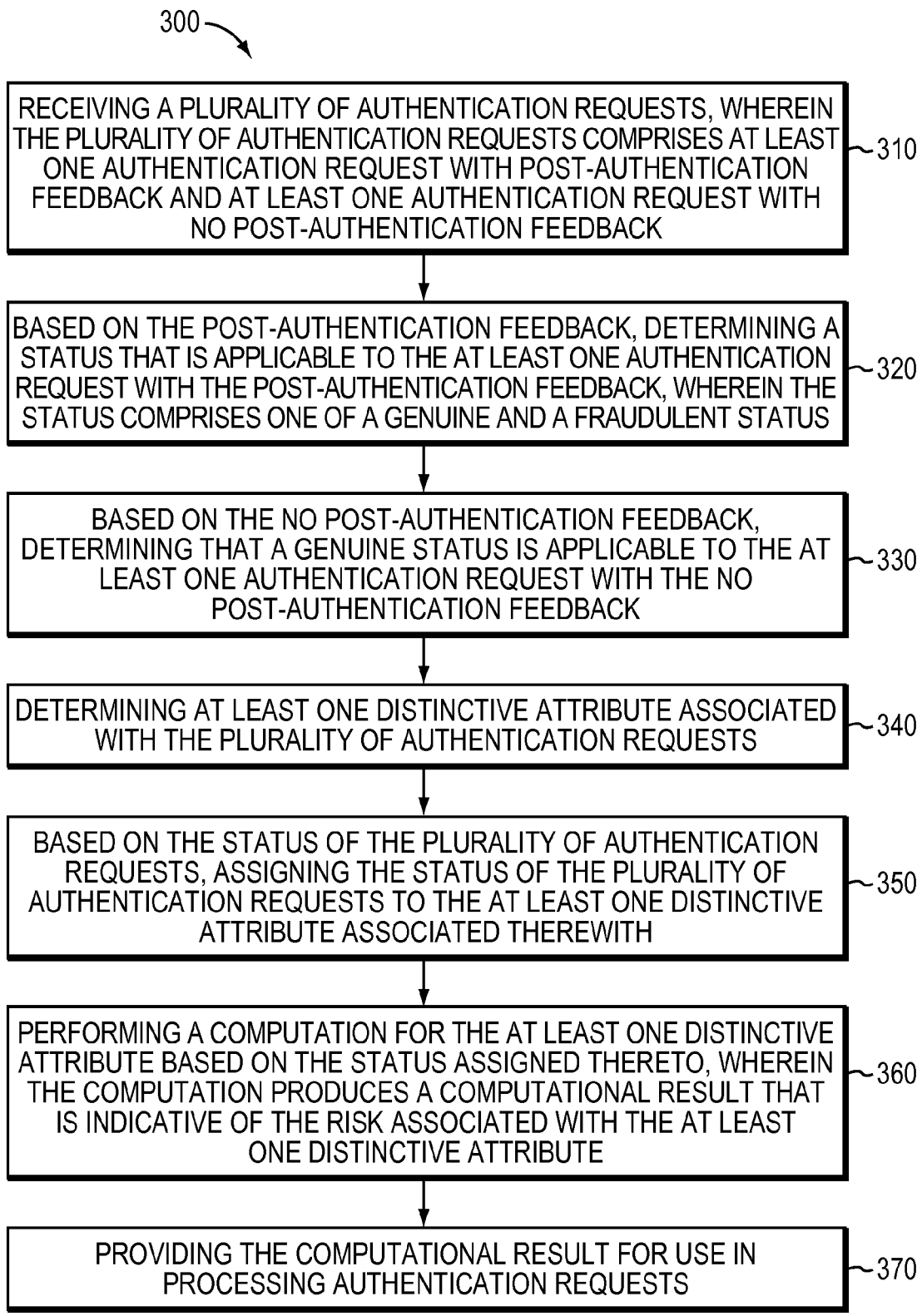
FIG. 3 is a flowchart illustrating a procedure which is performed by the device of FIG. 2 in the environment of FIG. 1.

Referring to FIG. 3, there is illustrated a flow chart of a procedure 300 for use in providing an assessment of authentication requests. In the flow diagram, the operations are summarized in individual blocks. The operations may be performed in hardware, or as processor-executable instructions that may be executed by a processor. Furthermore, the procedure may, but need not necessarily, be implemented in the environment 20 of FIG. 1.

At step 310, the procedure comprises receiving a plurality of authentication requests. In this particular case, it should be understood that the requests are received at the apparatus 31. Furthermore, it should be understood that the plurality of authentication requests comprise at least one authentication request with post-authentication feedback and at least one authentication request with no post-authentication feedback. For example, it will be appreciated from the foregoing description that post-authentication feedback can be provided by the analyst 35 at the case management system 29. The feedback can be provided by way of a marking indicating that the authentication request for which the case was opened is either genuine or fraudulent. If a case is not opened for a request, or the case is not marked as genuine or fraudulent, then the request will be considered to have no post-authentication feedback.

At step 320, the procedure comprises determining a status that is applicable to the at least one authentication request with the post-authentication feedback. In this particular case, it should be understood that the status is determined at the apparatus 31. Furthermore, it should be understood that the status comprises one of a genuine and a fraudulent status. Additionally, the determination of the status is based on the post-authentication feedback associated with the at least one request which may include a marking indicating the status.

At step 330, the procedure comprises determining that a genuine status is applicable to the at least one authentication request with the no post-authentication feedback. In this particular case, it should be understood that the genuine status is determined at the apparatus 31. Furthermore, it should be understood that the determination of the status is based on the fact that the request has no post-authentication feedback. For example, if a case is not been opened for the request at the case management system 29 then the request will be considered to be of genuine status indicating that the request is a low risk transaction.

At step 340, the procedure comprises determining at least one distinctive attribute associated with the plurality of authentication requests. In this particular case, it should be understood that the determination of the at least one distinctive attribute is performed at the apparatus 31. For example, the distinctive attribute can relate to any one or more of IP address, payee account, device fingerprint, mobile hardware ID, MAC address, etc. It should be appreciated that this list of attributes is not limited.

At step 350, the procedure comprises assigning the status of the plurality of authentication requests to the at least one distinctive attribute associated therewith. In this particular case, it should be understood that the assigning is performed at the apparatus 31. Furthermore, it should be understood that if an authentication request is determined to be genuine then the at least one distinctive attribute will also be determined to be genuine. In other words, the status of the at least one distinctive attribute is based on the status of the associated authentication request.

At step 360, the procedure comprises performing a computation for the at least one distinctive attribute based on the status assigned thereto. In this particular case, it should be understood that the computation is performed at the apparatus 31. Furthermore, it should be understood that the computation produces a computational result that is indicative of the risk associated with the at least one distinctive attribute. For example, the computation for the at least one distinctive attribute can produce a computational result by determining the amount of the at least one distinctive attribute with a fraudulent status associated therewith as a proportion of the total amount of the at least one distinctive attribute. In other words, if there is a high number of requests with a particular attribute having a fraudulent status assigned thereto as a proportion of the total number of requests with this particular attribute then there is a strong likelihood the computational result will indicate that this attribute is of high risk.

At step 360, the procedure comprises providing the computational result for use in processing authentication requests. In this particular case, it should be understood that the step is performed or initiated at the apparatus 31. Furthermore, it should be understood that the computational result can be included in the assessment 50 and fed back to the authentication server 24 thus forming a feedback loop. As another example, the assessment 50 may be distributed to multiple authentication servers 34, i.e., shared over central fraud networks and ecosystems.

It should be appreciated that the above procedure 300 can also comprise other steps not illustrated in the figure. In one particular embodiment, if the step of determining at least one distinctive attribute comprises determining that an IP address is the distinctive attribute associated with the requests, then the procedure 300 can further comprise the step of determining geo-location related data (e.g., country, city, geo-location co-ordinates, etc) associated with the authentication requests so that it can be ascertained if the IP address is a mobile gateway, proxy, aggregator and the like. For example, the message 49 can include geo-location related data associated with the authentication requests. The procedure 300 can further comprise the step of comparing if the geo-location related data associated with the authentication requests is similar. The procedure 300 can further comprise determining the status of the authentication requests associated with the IP address as genuine in response to the geo-location related data associated with the authentication requests being similar. Furthermore, the computation for the IP address produces a computational result which can result in the IP address being white-listed in response to the geo-location related data associated with the authentication requests being similar.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

What is claimed is:

1. A method, comprising:
   receiving, by an electronic apparatus, a plurality of authentication requests, wherein the plurality of authentication requests comprises at least one authentication request with post-authentication feedback and at least one authentication request with no post-authentication feedback;
   based on the post-authentication feedback, determining, by the electronic apparatus, a status that is applicable to the at least one authentication request with the post-authentication feedback, wherein the status comprises one of a genuine and a fraudulent status;
   based on the no post-authentication feedback, determining, by the electronic apparatus, that a genuine status is applicable to the at least one authentication request with the no post-authentication feedback;
   determining, by the electronic apparatus, at least one distinctive attribute associated with the plurality of authentication requests;
   based on the status of the plurality of authentication requests, assigning, by the electronic apparatus, the status of the plurality of authentication requests to the at least one distinctive attribute associated therewith;
   performing, by the electronic apparatus, a computation for the at least one distinctive attribute based on the status assigned thereto, wherein the computation produces a computational result that is indicative of the risk associated with the at least one distinctive attribute;
   providing, by the electronic apparatus, the computational result to an authentication system; and
   based on the provided computational result, processing, by the authentication system, authentication requests that comprise the attribute.

2. The method as claimed in claim 1, wherein the computation for the at least one distinctive attribute produces a computational result by determining the amount of the at least one distinctive attribute with a fraudulent status associated therewith as a proportion of the total amount of the at least one distinctive attributes.

3. The method as claimed in claim 1, wherein the at least one distinctive attribute is selected from the group consisting of:
   IP address
   payee account
   device fingerprint
   mobile hardware ID
   MAC address.

4. The method as claimed in claim 1, wherein the authentication request is provided with post-authentication feedback in response to an analyst marking the authentication request as one of a fraudulent and a genuine status during a post authentication review of the authentication request.

5. The method as claimed in claim 1, wherein the authentication request is provided with no post-authentication feedback in response to an analyst failing to mark the authentication request as one of a genuine and a fraudulent status during a post authentication review of the authentication request.

6. The method as claimed in claim 1, wherein determining at least one distinctive attribute associated with the authentication requests comprises determining that an IP address is the distinctive attribute; and
   wherein the method further comprises determining geo-location related data associated with the authentication requests.

7. The method as claimed in claim 6, wherein the method further comprises comparing if the geo-location related data associated with the authentication requests is similar.

8. The method as claimed in claim 7, wherein the method further comprises determining the status of the authentication requests associated with the IP address as genuine in response to the geo-location related data associated with the authentication requests being similar.

9. The method as claimed in claim 8, wherein the computation for the IP address produces a computational result which can result in the IP address being white-listed in response to the geo-location related data associated with the authentication requests being similar.

10. An electronic apparatus, comprising:
a network interface;
memory; and
control circuitry coupled to the network interface and memory, the memory storing instructions, which, when carried out by the control circuitry, cause the control circuitry to:
receive a plurality of authentication requests, wherein the plurality of authentication requests comprises at least one authentication request with post-authentication feedback and at least one authentication request with no post-authentication feedback;
based on the post-authentication feedback, determine a status that is applicable to the at least one authentication request with the post-authentication feedback, wherein the status comprises one of a genuine and a fraudulent status;
based on the no post-authentication feedback, determine that a genuine status is applicable to the at least one authentication request with the no post-authentication feedback;
determine at least one distinctive attribute associated with the plurality of authentication requests;
based on the status of the plurality of authentication requests, assign the status of the plurality of authentication requests to the at least one distinctive attribute associated therewith;
perform a computation for the at least one distinctive attribute based on the status assigned thereto, wherein the computation produces a computational result that is indicative of the risk associated with the at least one distinctive attribute; and
provide the computational result to an authentication system, wherein the authentication system processes, based on the provided computational result, authentication requests that comprise the attribute.

11. The electronic apparatus as claimed in claim 10, wherein the computation for the at least one distinctive attribute produces a computational result by determining the amount of the at least one distinctive attribute with a fraudulent status associated therewith as a proportion of the total amount of the at least one distinctive attributes.

12. The electronic apparatus as claimed in claim 10, wherein the at least one distinctive attribute is selected from the group consisting of:
IP address
payee account
device fingerprint
mobile hardware ID
MAC address.

13. The electronic apparatus as claimed in claim 10, wherein the authentication request is provided with post-authentication feedback in response to an analyst marking the authentication request as one of a fraudulent and a genuine status during a post authentication review of the authentication request.

14. The electronic apparatus as claimed in claim 10, wherein the authentication request is provided with no post-authentication feedback in response to an analyst failing to mark the authentication request as one of a genuine and a fraudulent status during a post authentication review of the authentication request.

15. A computer program product having a non-transitory computer readable storage medium which stores a set of instructions for use in providing an assessment of authentication requests, the set of instructions, when carried out by computerized circuitry, causing the computerized circuitry to perform a method of:
receiving a plurality of authentication requests, wherein the plurality of authentication requests comprises at least one authentication request with post-authentication feedback and at least one authentication request with no post-authentication feedback;
based on the post-authentication feedback, determining a status that is applicable to the at least one authentication request with the post-authentication feedback, wherein the status comprises one of a genuine and a fraudulent status;
based on the no post-authentication feedback, determining that a genuine status is applicable to the at least one authentication request with the no post-authentication feedback;
determining at least one distinctive attribute associated with the plurality of authentication requests;
based on the status of the plurality of authentication requests, assigning the status of the plurality of authentication requests to the at least one distinctive attribute associated therewith;
performing a computation for the at least one distinctive attribute based on the status assigned thereto, wherein the computation produces a computational result that is indicative of the risk associated with the at least one distinctive attribute;
providing the computational result to an authentication system; and
based on the provided computational result, processing, by the authentication system, authentication requests that comprise the attribute.

16. The computer program product as claimed in claim 15, wherein the computation for the at least one distinctive attribute produces a computational result by determining the amount of the at least one distinctive attribute with a fraudulent status associated therewith as a proportion of the total amount of the at least one distinctive attributes.

17. The computer program product as claimed in claim 15, wherein the at least one distinctive attribute is selected from the group consisting of:
IP address
payee account
device fingerprint
mobile hardware ID
MAC address.

18. The computer program product as claimed in claim 15, wherein the authentication request is provided with post-authentication feedback in response to an analyst marking the authentication request as one of a fraudulent and a genuine status during a post authentication review of the authentication request.

19. The computer program product as claimed in claim 15, wherein the authentication request is provided with no post-authentication feedback in response to an analyst failing to mark the authentication request as one of a genuine and a fraudulent status during a post authentication review of the authentication request.

* * * * *